United States Patent
Saito

(10) Patent No.: US 9,204,069 B2
(45) Date of Patent: Dec. 1, 2015

(54) METHOD FOR DRIVING IMAGING APPARATUS, METHOD FOR DRIVING IMAGING SYSTEM, IMAGING APPARATUS, AND IMAGING SYSTEM

(71) Applicant: CANON KABUSHIKI KAISHA, Tokyo (JP)

(72) Inventor: Kazuhiro Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 14/013,294

(22) Filed: Aug. 29, 2013

(65) Prior Publication Data

US 2014/0063308 A1    Mar. 6, 2014

(30) Foreign Application Priority Data

Sep. 3, 2012    (JP) ................. 2012-193139

(51) Int. Cl.
*H04N 5/3745* (2011.01)
*H04N 5/363* (2011.01)
*H04N 5/378* (2011.01)

(52) U.S. Cl.
CPC ........... *H04N 5/37455* (2013.01); *H04N 5/363* (2013.01); *H04N 5/378* (2013.01); *H04N 5/3745* (2013.01)

(58) Field of Classification Search
CPC ....... H04N 5/378; H04N 5/335; H04N 5/374; H04N 5/37457; H04N 5/353; H04N 5/357; H04N 9/045; H04N 3/155; H04N 5/341; H04N 5/355
USPC .......................................... 348/308, 297, 302
See application file for complete search history.

(56) References Cited

U.S. PATENT DOCUMENTS 7,623,173 B2 * 11/2009 Nitta et al. .................... 348/302
2013/0194445 A1 * 8/2013 Brown et al. ............... 348/222.1

FOREIGN PATENT DOCUMENTS

JP    2008-136042 A    6/2008

* cited by examiner

*Primary Examiner* — Twyler Haskins
*Assistant Examiner* — Padma Haliyur
(74) *Attorney, Agent, or Firm* — Canon U.S.A., Inc., IP Division

(57) ABSTRACT

A method for driving an imaging apparatus, a method for driving an imaging system, an imaging apparatus, and an imaging system are disclosed in which the number of times of operation which generates digital signals based on an offset component of a comparing circuit is fewer than the number of times of operations which generate digital signals based on photoelectric conversion signals output by a plurality of rows of pixels.

16 Claims, 11 Drawing Sheets

METHOD FOR DRIVING IMAGING APPARATUS, METHOD FOR DRIVING IMAGING SYSTEM, IMAGING APPARATUS, AND IMAGING SYSTEM

BACKGROUND OF THE INVENTION

1. Field of the Invention

The present disclosure relates to a method for driving an imaging apparatus having an analog-digital converting unit which converts an analog signal to a digital signal, a method for driving an imaging system, an imaging apparatus, and an imaging system.

2. Description of the Related Art

As an example of imaging apparatuses, an imaging apparatus has been known including pixels which perform photoelectric conversion and output signals based on incident light and a column parallel analog-digital conversion unit (hereinafter, called a column ADC where ADC stands for analog digital converter) having an AD converter at each column of a pixel array having pixels arranged in a matrix form. In the column ADC, the AD converter at each column converts an analog signal (hereinafter, called a pixel signal) output from a pixel to a digital signal.

Japanese Patent Laid-Open No. 2008-136042 discloses an imaging apparatus which AD converts a noise signal output from a pixel and a photoelectric conversion signal based on incident light. Hereinafter, a noise signal and a photoelectric conversion signal will be collectively called a pixel signal. A digital signal based on a noise signal and a digital signal based on a photoelectric conversion signal contain an offset component of an AD converter. Japanese Patent Laid-Open No. 2008-136042 discloses an imaging apparatus which acquires a difference between a digital signal based on a photoelectric conversion signal and a digital signal based on a noise signal in order to reduce an offset component contained in a digital signal based on the photoelectric conversion signal at an AD converter. Thus, the imaging apparatus in Japanese Patent Laid-Open No. 2008-136042 generates a digital signal containing a less offset component of an AD converter.

SUMMARY OF THE INVENTION

An embodiment of the invention was made in order to solve the problems. According to an aspect of the invention, there is provided a method for driving an imaging apparatus having a plurality of pixels each of which outputs a photoelectric conversion signal based on incident light and an analog-digital converter having an input part which receives input of a potential based on the photoelectric conversion signals, the method including performing a first AD conversion which generates a first digital signal based on the reset potential at the input part, by the analog-digital converter, performing a plurality of second AD conversions which generates a second digital signal on the basis of the potential at the input part to which the potential based on the photoelectric conversion signal is given and generating a plurality of the second digital signals based on the photoelectric conversion signals from the plurality of pixels, by the analog-digital converter, and acquiring differences between the first digital signal and the plurality of second digital signals, by the imaging apparatus, wherein the number of times of the first AD conversion is fewer than the number of times of the second AD conversion.

According to another aspect of the invention, there is provided a method for driving an imaging system having an imaging apparatus, a signal processing unit, and an analog-digital converter, the imaging apparatus having a plurality of pixels each of which outputs photoelectric conversion signals based on incident light, the analog-digital converter having an input part which receives input of a potential based on the photoelectric conversion signals output by the plurality of pixels, the driving method including performing a first AD conversion which generates a first digital signal based on the reset potential at the input part, by means of the analog-digital converter, performing a plurality of second AD conversions which generates a second digital signal on the basis of the potential at the input part to which the potential based on the photoelectric conversion signal is given and generating a plurality of the second digital signals based on the photoelectric conversion signals from the plurality of pixels, by means of the analog-digital converter, outputting the first digital signal and the plurality of second digital signals to the signal processing unit, by means of the imaging apparatus; and acquiring differences between the first digital signal and each of the plurality of second digital signals, by the signal processing unit, wherein the number of times of the first AD conversion performed by the analog-digital converter is fewer than the number of times of the second AD conversion.

According to another aspect of the invention, there is provided an imaging apparatus including a plurality of pixels each of which outputs a photoelectric conversion signal based on incident light, an analog-digital converter having an input part which receives input of a potential based on the photoelectric conversion signals output by the plurality of pixels, a control unit, and a difference signal generation unit, wherein the control unit causes the analog-digital converter to perform a first AD conversion which generates a first digital signal based on the reset potential at the input part, and causes the analog-digital converter to generate second digital signals based on the potential at the input part having received the photoelectric conversion signals from each of the plurality of pixels by performing a plurality of second AD conversions, the difference signal generation unit acquires differences between the first digital signal and each of the plurality of second digital signals, and the control unit causes the analog-digital converter to perform the first AD conversion a fewer number of times than those on the second AD conversion.

According to another aspect of the invention, there is provided an imaging system including an imaging apparatus, a signal processing unit, and a control unit, wherein the imaging apparatus has a plurality of pixels each of which outputs a photoelectric conversion signal based on incident light and an analog-digital converter, the analog-digital converter has an input part which receives input of a potential based on the photoelectric conversion signals output by the plurality of pixels, and the control unit causes the analog-digital converter to perform a first AD conversion which generates a first digital signal based on the reset potential at the input part, and causes the analog-digital converter to generate second digital signals based on the potential at the input part having received the photoelectric conversion signals from each of the plurality of pixels by performing a plurality of second AD conversions; the signal processing unit acquires differences between the first digital signal and each of the plurality of second digital signals, and the control unit causes the analog-digital converter to perform the first AD conversion a fewer number of times than those on the second AD conversion.

Further features of the present invention will become apparent from the following description of exemplary embodiments with reference to the attached drawings.

DESCRIPTION OF THE EMBODIMENTS

In an imaging apparatus in Japanese Patent Laid-Open No. 2008-136042, in order to reduce an offset component of an AD converter from a digital signal based on a photoelectric conversion signal, a signal of an offset component of an AD converter has been AD-converted every time a vertical scanning unit scans a row and causes each of pixels therein to output a pixel signal. This disadvantageously may increase the period of time of an AD conversion period of a pixel signal of each of a plurality of pixels.

Exemplary embodiments which will be described below may solve the problem.

First Exemplary Embodiment

An imaging apparatus according to a first embodiment will be described below with reference to drawings.

Figure 1:
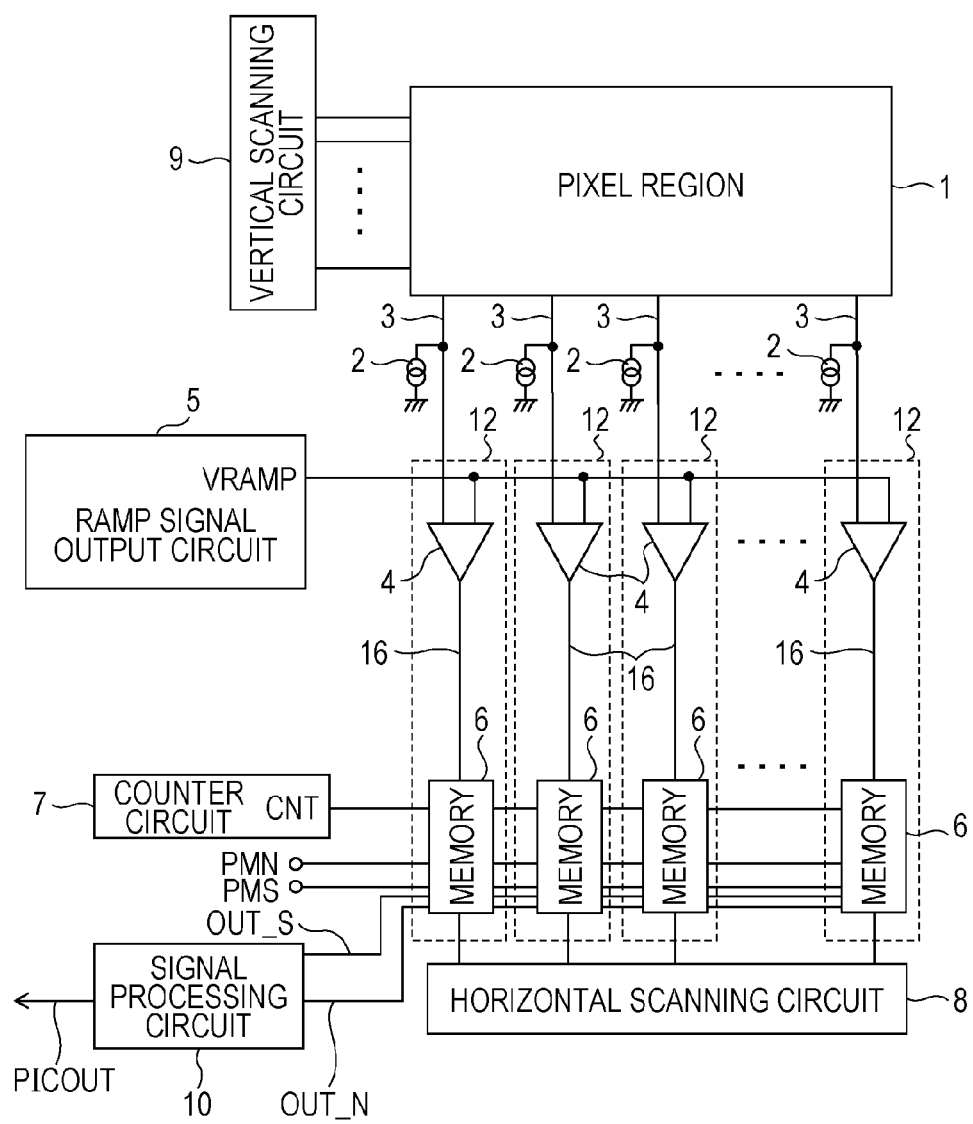
FIG. 1 is a schematic diagram of an example of an imaging apparatus.

FIG. 1 is a schematic diagram illustrating an example of an imaging apparatus according to this embodiment. An imaging apparatus according to this embodiment includes a pixel region 1, a vertical output current source 2, a vertical output line 3, a comparing circuit 4, a ramp signal output circuit 5, a memory 6, a counter circuit 7, a horizontal scanning circuit 8, a vertical scanning circuit 9, and a signal processing circuit 10. The pixel region 1 a plurality of rows and a plurality of columns of pixels 100. In other words, the pixel region 1 has a plurality of pixels 100 arranged in a matrix form. A plurality of AD converters 12 are provided each of which includes the comparing circuit 4 and memory 6.

First, the pixel region 1 and the vertical scanning circuit 9 will be described with reference to FIG. 2.

Figure 2:
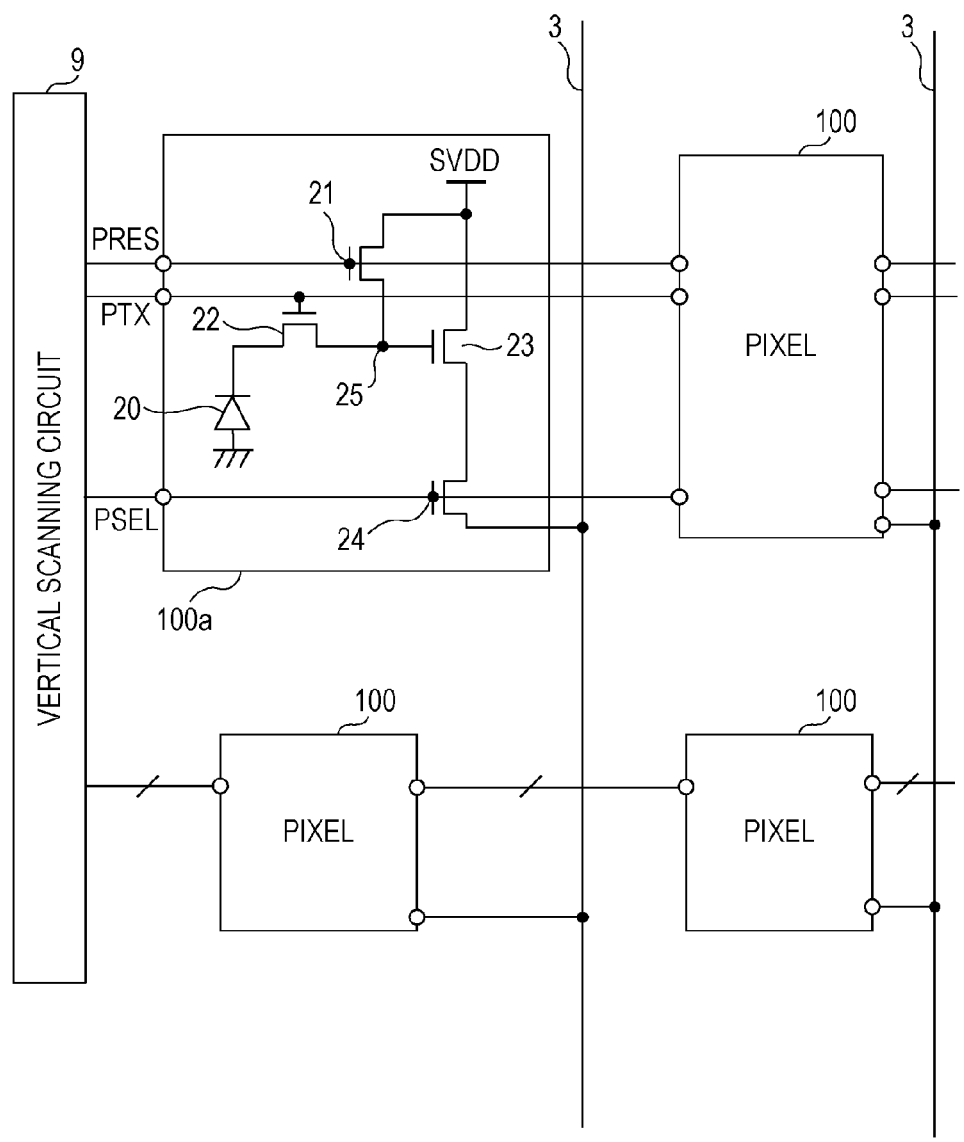
FIG. 2 is a schematic diagram of an example of a pixel.

FIG. 2 partially illustrates two rows and two columns of pixels 100 in a partial area of the pixel region 1, the vertical scanning circuit 9, and the vertical output line 3. One pixel 100a has a specific configuration of each of the pixels 100 included in the pixel region 1. The pixel 100 has a photodiode 20, a reset MOS transistor 21, a transfer MOS transistor 22, an amplifying MOS transistor 23, and a selection MOS transistor 24 in the photoelectric conversion part. The photodiode 20 converts incident light to charges. The transfer MOS transistor 22 transfers charges accumulated in the photodiode 20 to a gate of the amplifying MOS transistor 23. A transfer signal PTX is given from the vertical scanning circuit 9 to a gate of the transfer MOS transistor 22.

The amplifying MOS transistor 23 amplifies and outputs a signal based on charges transferred to the gate of the amplifying MOS transistor 23. Power supply voltage SVDD is applied to the amplifying MOS transistor 23 which is electrically connected to the selection MOS transistor 24. The selection MOS transistor 24 is provided on an electrical path between the amplifying MOS transistor 23 and the vertical output line 3 has a gate to which a selection signal PSEL is given from the vertical scanning circuit 9. The vertical scanning circuit 9 shifts a signal value of the selection signal PSEL to a high level (hereinafter, called an H level) every row of pixel 100 and scans rows of pixels. Hereinafter, a Low level will be called an L level similarly.

The reset MOS transistor 21 has one main electrode electrically connected to the gate of the amplifying MOS transistor 23 and the other main electrode which receives common power supply voltage SVDD to one given to the amplifying MOS transistor 23. A reset signal PRES is given from the vertical scanning circuit 9 to the gate of the reset MOS transistor 21. When the vertical scanning circuit 9 shifts the reset signal PRES to an H level, the reset MOS transistor 21 resets the potential of the gate of amplifying MOS transistor 23. The signal output from the amplifying MOS transistor 23 outputs a pixel signal PIXOUT to the vertical output line 3 through the selection MOS transistor 24. The pixel signal PIXOUT output on the basis of the reset potential of the gate of the amplifying MOS transistor 23 will be called a noise signal. The pixel signal PIXOUT output in response to transfer of charges generated by the photodiode 20 to the gate of the amplifying MOS transistor 23 will be called a photoelectric conversion signal.

The vertical scanning circuit 9 sequentially scans rows of pixels 100 and causes the pixels 100 to sequentially output the pixel signals PIXOUT.

Referring back to FIG. 1, an imaging apparatus of this embodiment will be described. The vertical output current source 2 is electrically connected to the vertical output line 3 and feeds current to the vertical output line 3.

The comparing circuit 4 compares between a pixel signal PIXOUT given from the pixel region 1 and a reference signal VRAMP given from the ramp signal output circuit 5. The reference signal VRAMP to be compared is a ramp signal which has a potential depending on the time. When the magnitude relationship between the pixel signal PIXOUT and the reference signal VRAMP is reversed, the comparing circuit 4 outputs a latch signal LATCH to the memory 6 through a latch signal output line 16.

When a timing generator, not illustrated, starts a change dependent on the time of a reference signal VRAMP in the ramp signal output circuit 5, the counter circuit 7 outputs a count signal CNT generated by counting clock signals CLK given from a clock signal supply unit, not illustrated. In other words, the counter circuit 7 counts clock signals CLK in parallel with changes of the potential of the reference signal VRAMP and generates and outputs a count signal CNT. The count signal CNT is commonly given to the memories 6 of the columns.

Each of the memories 6 receives a count signal CNT from the counter circuit 7. The memory 6 is provided in each column for the comparing circuit 4 of the column. When a signal value of a latch signal LATCH given from the comparing circuit 4 changes, the memory 6 holds a count signal CNT given from the counter circuit 7.

The memory 6 has an N memory which holds a digital signal acquired by AD converting a signal based on an offset component of the comparing circuit 4 and an S memory which holds a digital signal acquired by AD converting a photoelectric conversion signal. The memory 6 receives memory operation signals PMN and PMS from a timing generator, not illustrated. In a period where the timing generator shifts the memory operation signal PMN to an H level, when the signal value of the latch signal LATCH output by the comparing circuit 4 is shifted to an H level, the N memory holds the count signal CNT. Similarly, in a period when the timing generator shifts the memory operation signal PMS to an H level, when the signal value of the latch signal LATCH output by the comparing circuit 4 is shifted to an H level, the S memory holds the count signal CNT. The timing generator, not illustrated, is a control unit which controls an AD conversion operation of the AD converter 12.

The horizontal scanning circuit 8 sequentially scans the memories 6 of the columns. The memories 6 of the columns sequentially transfer the count signals CNT held by the N memory and S memory to the signal processing circuit 10.

The signal processing circuit 10 processes signals transferred from the columns of the memories 6 by the horizontal scanning circuit 8 and outputs an output signal PICOUT. The output signal PICOUT is a signal output from an imaging apparatus according to this embodiment for forming an image. The signal processing circuit 10 is a difference signal generation unit.

Next, the comparing circuit 4 exemplarily illustrated in FIG. 1 will be described with reference to FIGS. 3A to 3C.

Figure 3A:
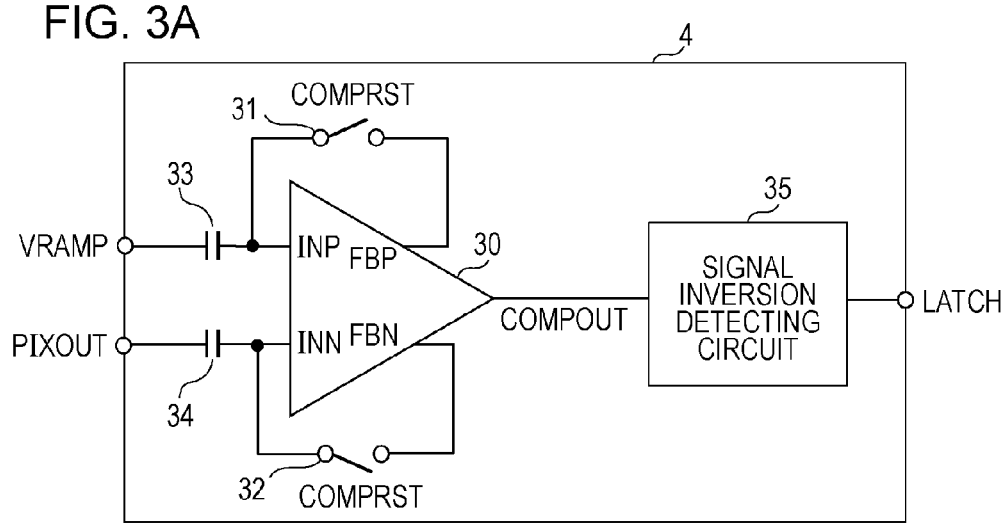
FIG. 3A is a schematic diagram of an example of a comparing circuit.

FIG. 3A is an equivalent circuit diagram of the comparing circuit 4. The comparing circuit 4 includes a differential amplifier 30, comparing-circuit reset switches 31 and 32, comparing-circuit input capacitor elements 33 and 34, and a signal inversion detecting circuit 35. A pixel signal PIXOUT is provided to an input terminal INN of the differential amplifier 30 through the comparing-circuit input capacitor element 34. The potential of the input terminal INN will be called a V-INN. The input terminal INN is an input part of the AD converter 12 according to this embodiment. A reference signal VRAMP is provided to an input terminal INP of the differential amplifier 30 through the comparing-circuit input capacitor element 33. The potential of the input terminal INP will be called a potential V-INP. The input terminal INP is a reference-signal input terminal.

The comparing-circuit reset switch 31 is used to shift between conduction and non-conduction of a feedback path from a feedback terminal FBP to the input terminal INP in response to a comparing circuit reset signal COMPRST. The comparing-circuit reset switch 32 is used to shift between conduction and non-conduction of a feedback path from a feedback terminal FBN to the input terminal INN in response to the same comparing circuit reset signal COMPRST. When the comparing circuit reset signal COMPRST is shifted to an H level, the feedback path from the feedback terminal FBP to the input terminal INP and the feedback path from the feedback terminal FBN to the input terminal INN are brought into a conducting state. The differential amplifier 30 outputs a comparison result signal COMPOUT to the signal-inversion detecting circuit 35. When the signal value of the comparison result signal COMPOUT changes, the signal value of a latch signal LATCH output from the signal-inversion detecting circuit 35 changes.

Figure 3B:
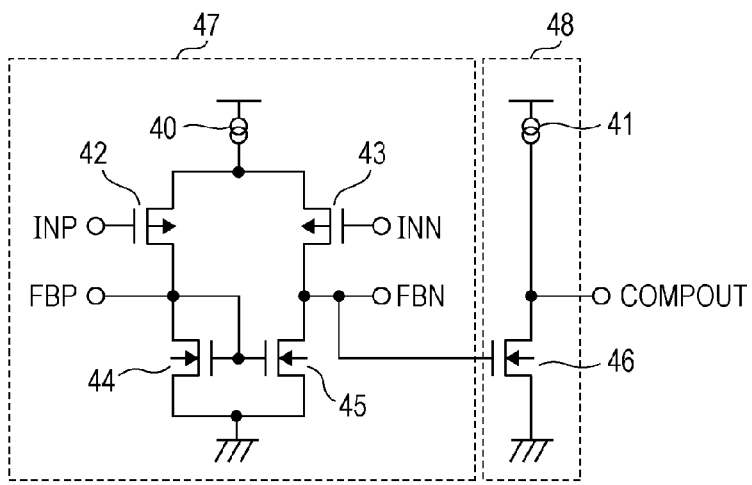
FIG. 3B is a schematic diagram of an example of a comparing circuit.

FIG. 3B is an equivalent circuit diagram of the differential amplifier 30. The differential amplifier 30 is a two-stage amplifier including a differential unit 47 a first current source 40, differential-input-stage PMOS transistors 42 and 43, and load NMOS transistors 44 and 45 and a comparison-result signal output unit 48 including a second current source 41 and an NMOS transistor 46. If a potential V-INP based on a reference signal VRAMP provided to the input terminal INP is lower than a potential V-INN based on a pixel signal PIXOUT provided to the input terminal INN, the NMOS transistor 46 has an ON state, and the comparison result signal COMPOUT has an L level. If the potential V-INP is higher than the potential V-INN, the NMOS transistor 46 is shifted to an OFF state, and the comparison result signal COMPOUT is shifted to an H level. When the comparison result signal COMPOUT is shifted from an L level to an H level, the latch signal LATCH having an H level is output to the memory 6.

Figure 3C:
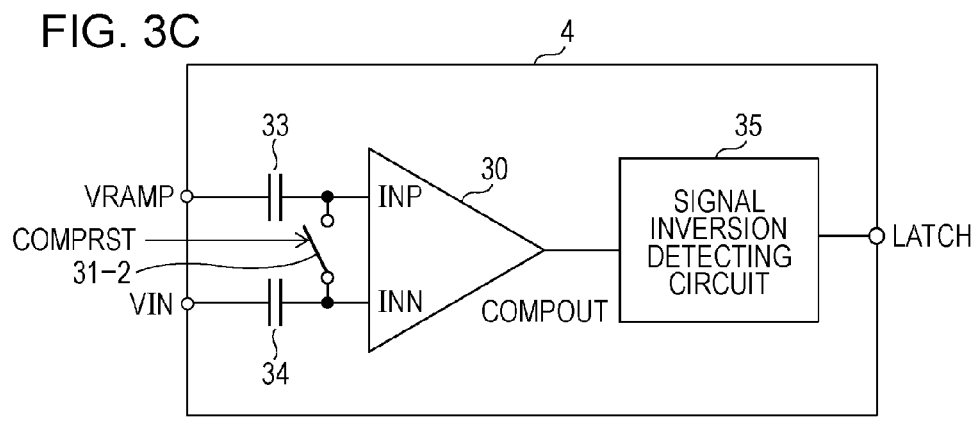
FIG. 3C is a schematic diagram of an example of a comparing circuit.

FIG. 3C illustrates another configuration of the comparing circuit 4. The same reference numerals as those given in FIG. 3A are given to parts in FIG. 3C having the same functions as those in FIG. 3A. The comparing circuit 4 illustrated in FIG. 3A includes the comparing-circuit reset switches 31 and 32. On the other hand, the comparing circuit 4 in FIG. 3C includes a comparing-circuit reset switch 31-2 which shifts between connection and non-connection of electrodes electrically connected to the differential amplifiers 30 of the comparing-circuit input capacitor elements 33 and 34. When the comparing-circuit reset switch 31-2 is brought into a conducting state, the charges in the comparing-circuit input capacitor elements 33 and 34 are reset. When the comparing circuit reset signal COMPRST has an H level, the comparing-circuit reset switch 31-2 has a conducting state. When the comparing circuit reset signal COMPRST has an L level, the comparing-circuit reset switch 31-2 has a non-conducting state.

Figure 4:
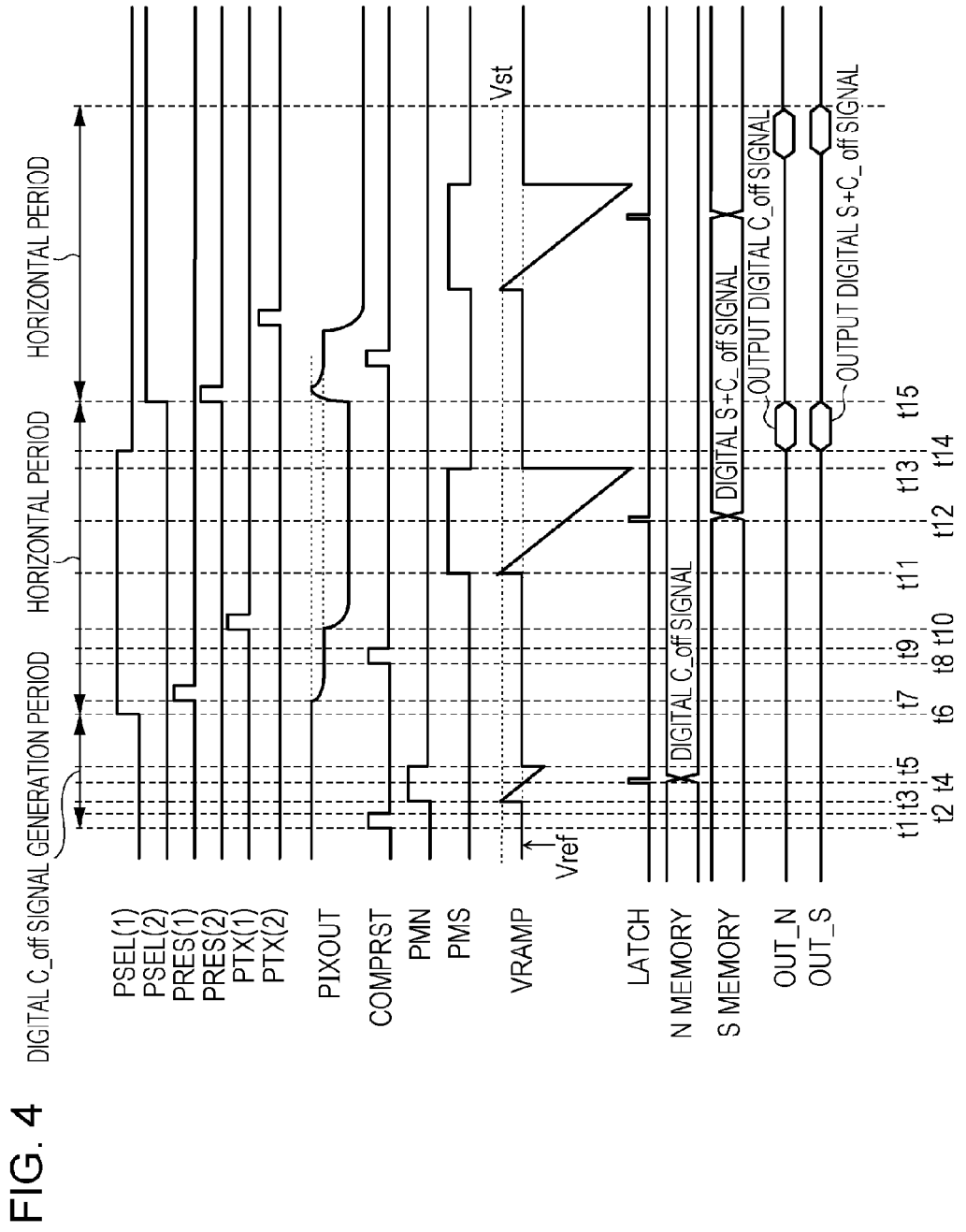
FIG. 4 is a timing chart illustrating an example of an operation of an imaging apparatus.

FIG. 4 illustrates an operation timing chart of an example of an operation of an imaging apparatus according to this embodiment. The operation timing chart in FIG. 4 illustrates an operation which outputs a pixel signal PIXOUT by two rows of pixels 100 and an operation by the AD converter 12.

At a time t1, a comparing circuit reset signal COMPRST is shifted to an H level, and the charges in the comparing-circuit input capacitor elements 33 and 34 are reset. After that, at a time t2, the comparing circuit reset signal COMPRST is shifted to an L level.

At a time t3, the timing generator shifts a memory operation signal PMN to an H level. This allows the N memory to hold a count signal CNT. At the same time, the ramp signal output circuit 5 offsets the potential of the reference signal VRAMP from a potential Vref to a potential Vst. From the potential Vst, the potential starts to change depending on time. The direction of changes depending on time of the potential of the reference signal VRAMP is opposite direction of the direction if the shift from the potential Vref to the potential Vst.

For example, at a time t4, the comparing circuit 4 outputs a latch signal LATCH. The N memory holds the count signal CNT at that time. The count signal CNT held by the N memory will be called a digital C_off signal. The digital C_off signal is a digital signal based on an offset component that each of a plurality of comparing circuits 4 has. The digital C_off signal is a first digital signal according to this embodiment.

At a time t5, the timing generator shifts the memory operation signal PMN to an L level. At the same time, the ramp signal output circuit 5 finishes the change of the potential depending on time of the reference signal VRAMP and returns the potential of the reference signal VRAMP to Vref.

At a time t6, the vertical scanning circuit 9 shifts a selection signal PSEL(1) to be given to the pixels 100 at the first row to an H level. Thus, the pixels 100 at the first row output pixel signals PIXOUT to the vertical output line 3.

At a time t7, a reset signal PRES(1) to be given to the pixels 100 at the first row is shifted to an H level, which resets the potential of a gate of the amplifying MOS transistor 23. After that, the reset signal PRES(1) is shifted to an L level.

At a time t8, the comparing circuit reset signal COMPRST is shifted to an H level, which resets charges in the comparing-circuit input capacitor elements 33 and 34. After that, at a time t9, the comparing circuit reset signal COMPRST is shifted to an L level. The comparing-circuit input capacitor element 34 holds charges based on the potential of the vertical output line 3 at the time t9. The signal held in the comparing-circuit input capacitor element 34 is a noise signal output by a pixel 100. The comparing-circuit input capacitor element 33 also holds charges based on the potential of the reference signal VRAMP at the time t9.

At a time t10, a transfer signal PTX(1) to be given to the pixels 100 at the first row is shifted to an H level and then to L level. Thus, charges generated by the photodiode 20 are transferred to a gate of the amplifying MOS transistor 23, and the pixels 100 output a photoelectric conversion signal to the vertical output line 3. The noise signal is held in the comparing-circuit input capacitor element 34. Thus, a signal acquired by subtracting the noise signal from a photoelectric conversion signal (hereinafter, called an S signal) is given to the input terminal INN of the differential amplifier 30.

At a time t11, the timing generator shifts the memory operation signal PMS to an H level. This allows the S memory to hold a count signal CNT. At the same time, the ramp signal output circuit 5 offsets the potential of the reference signal VRAMP from the potential Vref to the potential Vst. From the potential Vst, the change of the potential depending on time starts.

For example, at a time t12, the comparing circuit 4 outputs a latch signal LATCH. The S memory holds the count signal CNT at that time. The count signal CNT held by the S memory is a digital signal based on a signal in which an S signal and offset components that a plurality of comparing circuits 4 have are superposed. The digital signal will be called a digital S+C_off signal. The digital S+C_off signal is a second digital signal.

At a time t13, the timing generator shifts the memory operation signal PMS to an L level. At the same time, the ramp signal output circuit 5 finishes the change of the potential depending on time of the reference signal VRAMP and returns the potential of the reference signal VRAMP to Vref.

At a time t14, the vertical scanning circuit shifts the selection signal PSEL(1) to select the pixels 100 at the first row to an L level. During a period from a time t14 to a time t15, the horizontal scanning circuit 8 causes the memories 6 at columns to sequentially output the memory held signals.

The period from the time t1 to the time t6 will be called a digital C_off signal generation period. An AD conversion to be performed in the digital C_off signal generation period is a first AD conversion. The period from the time t6 to the time t15 will be called a "horizontal period". An AD conversion to be performed in the horizontal period is a second AD conversion.

A plurality of comparing circuits 4 may have offset components having signal values that may vary between each other. The digital C_off signal is subtracted from the digital S+C_off signal to acquire a signal excluding a variation of the signal value of the offset component of each of the comparing circuits 4 (hereinafter, which will be called a digital S signal). The digital S signal is a digital signal based on an S signal.

In the imaging apparatus according to this embodiment, the comparing-circuit input capacitor element 34 may subtract a noise signal from a photoelectric conversion signal. A digital C_off signal is subtracted from a digital S+C_off signal to acquire a digital S signal. Thus, a digital signal may be acquired which has a less noise component of the pixel 100 and a less offset component of the comparing circuit 4.

The imaging apparatus of this embodiment performs an operation which repeats a plurality of horizontal periods which converts a pixel signal PIXOUT output by the pixel 100 to a digital signal after one digital C_off signal generation period. Because the digital C_off signal is a digital signal based on an offset component of the comparing circuit 4, the digital C_off signal has a signal value that varies less. Therefore, the accuracy of the digital S signal is not easily lowered even when the same digital C_off signal generated by the same comparing circuit 4 that generates the digital S+C_off signal is subtracted from a plurality of digital S+C_off signals generated by the same comparing circuit 4. Thus, every time the pixel 100 outputs a pixel signal PIXOUT, a digital S signal from which an offset component of the comparing circuit 4 is reduced may be acquired without a digital C_off signal generation period. Because a noise signal output from the pixel 100 is held in the comparing-circuit input capacitor element 34, the signal to be given to the input terminal INN may be a signal acquired by subtracting the noise signal therefrom. In the imaging apparatus of this embodiment, the comparing-circuit input capacitor element 34 holds a noise signal and subtracts a digital C_off signal from a digital S+C_off signal to acquire a digital S signal with a less noise component.

The imaging apparatus of this embodiment has a plurality of horizontal periods for one digital C_off signal generation period. The plurality of horizontal periods may be one frame period that is a period when the vertical scanning circuit 9 sequentially scans all rows of pixels 100. In other words, the imaging apparatus of this embodiment may have one digital C_off signal generation period for one frame period. The timing generator which is a control unit of this embodiment causes the AD converter 12 to perform the first AD conversion a fewer number of times than the second AD conversion.

Figure 5A:
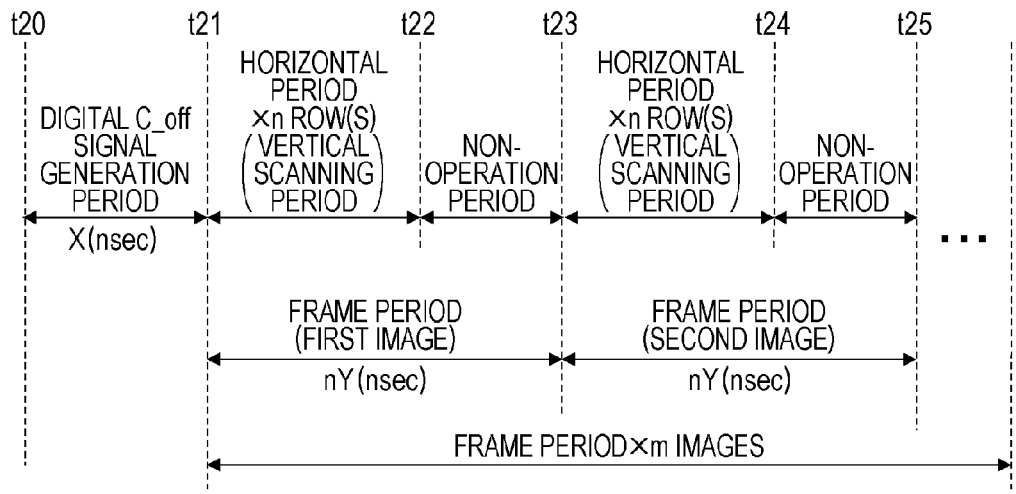
FIG. 5A is a timing chart illustrating an example of an operation of an imaging apparatus in a plurality of frame periods.

One digital C_off signal generation period may be provided for a plurality of frame periods. FIG. 5A illustrates the operation timing. First, at a time t20, the photodiode 20 of each of the pixels 100 starts an operation of accumulating signal charges based on incident light. During the digital C_off signal generation period from the time t20 to a time t21, the imaging apparatus generates a digital C_off signal. After that, during the period from the time t21 to a time t22, an operation of acquiring a digital S signal is performed on the pixels 100 at rows. The operation may allow the imaging apparatus to acquire digital signals required for one image. The period from the time t22 to a time t23 is a non-operation period so that the accumulation times of signal charges by the photodiode 20 are matched between the first image and the second image acquired in the next one frame period. The image generated first will be called a first image, and the image generated secondly will be called a second image. The non-operation period preferably has an equal period of time to that of the digital C_off signal generation period from the time t20 to the time t21. During the period from the time t23 to a time t24, the imaging apparatus performs an operation of acquiring a digital S signal based on the pixels 100 at rows like the previous period from the time t21 to the time t22. Thus, digital signals required for the second image may be acquired. During the non-operation period, the AD converter 12 is powered off. This may reduce the power consumption of the imaging apparatus.

A conventional imaging apparatus performs the operation in the digital C_off signal generation period on n rows. Therefore, when the period of time required for the digital C_off signal generation period is X (nsec), the digital C_off signal generation period for n rows is expressed by n×X=nX (nsec). When a horizontal period is equal to Y (nsec), the vertical scanning period for acquiring a digital S signal based on n rows of pixels 100 may be expressed by n×Y=nY (nsec). Therefore, the period of time required for acquiring digital S signals required for one image in an operation of the conventional imaging apparatus is equal to nX+nY (nsec). The time nX+nY (nsec) is a frame period of the conventional imaging apparatus. Including the period of time required for acquiring digital S signals for the second image, the time is equal to 2nX+2nY (nsec). On the other hand, in the imaging apparatus of this embodiment, one digital C_off signal generation period may only be required. Thus, it is equal to X (nsec). The period of time for acquiring digital S signals based on n rows of pixels 100 is equal to nY (nsec), like the conventional imaging apparatus. It is assumed here that the non-operation period is equal to Z (nsec). The Z (nsec) of the non-operation period may be X (nsec) that is equal to the digital C_off signal generation period.

For simple description, it is assumed that the non-operation period is equal to X (nsec) that is equal to the digital C_off signal generation period. The frame period of this embodiment is equal to X+nY (nsec) which is the sum of nY (nsec) of vertical scanning period and Z=X (nsec) of the non-operation period. In other words, the frame period is a period from the start of sequential scanning of a plurality of pixels through ends of the sequentially scanning of the plurality of pixels to the start of the next sequential scan of a plurality of pixels. The period required for acquiring digital S signals required for one image is equal to a sum of frame period and the digital C_off signal generation period and thus is equal to X+nY+X=2X+nY (nsec). Therefore, the imaging apparatus of this embodiment may shorten the period required for acquiring digital S signals required for one image compared with a conventional imaging apparatus where n>2. Furthermore, the digital C_off signal conversion period may be omitted when the imaging apparatus of this embodiment acquires digital S signals required for the second and subsequent images. In order to acquire digital S signals required for the first and second images, the imaging apparatus of this embodiment may apply a period of 3X+2nY (nsec) that is equal to a sum of a previous period of 2X+nY (nsec) and nY (nsec) and a non-operation period of X (nsec). When the imaging apparatus of this embodiment has a plurality of rows (n>1.5) of pixels, the AD conversion period for pixel signals of a plurality of rows of pixels 100 may be shortened, compared with a conventional imaging apparatus.

Figure 5B:
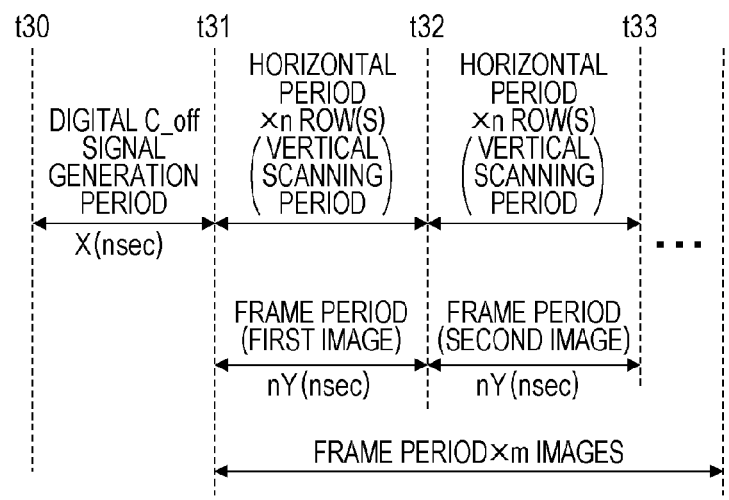
FIG. 5B is a timing chart illustrating an example of an operation of an imaging apparatus in a plurality of frame periods.

The configuration illustrated in FIG. 5A has non-operation periods for equalizing the periods for accumulating charges by the photodiodes 20 (hereinafter, called an accumulation period) between the first image and the second image. The next operation may be performed without the non-operation period. In the timing chart illustrated in FIG. 4, during the period from the time t7 to the time t8, the transfer signal PTX(1) may be shifted to an H level. Thus, the accumulation period for the pixels 100 at the first row may correspond to the period from the time t8 to the time t10. The horizontal period from the time t7 to the time t15 including the operation may be performed on pixels 100 at rows. Thus, an equal accumulation period may be performed on pixels 100 at rows. Alternatively, in the timing chart illustrated in FIG. 4, a period may be provided in which both of the signal PTX(1) and the signal PRES(1) from the pixels at the first row are shifted to an H level from the time t14. In other words, the non-operation period is not required if the accumulation period has a period of time that is equal to or shorter than the horizontal period. Therefore, the accumulation periods may be equalized between the first and the second images without the non-operation period from the time t22 to the time t23 in FIG. 5A. In this case, the digital C_off signal generation period from the time t30 to the time t31 as illustrated in FIG. 5B may be provided like the case in FIG. 5A. After that, the frame period for the first image from the time t31 to the time t32 and the frame period for the second image from the time t32 to the time t33 are provided serially. The time required for acquiring digital S signals required for the first image is equal to X+nY (nsec). Thus, if the imaging apparatus configured as illustrated in FIG. 5B has a plurality of (n>1) rows of pixels, the AD conversion period of the pixel signals of a plurality of rows of pixels 100 required for the first image may be shorter than that of a conventional imaging apparatus. In the imaging apparatus configured as illustrated in FIG. 5B, the AD conversion period for pixel signals from a plurality of rows of pixels 100 required for the first and second images is equal to 2X+2nY (nsec). If an imaging apparatus has a plurality of (n>1) rows of pixels, the imaging apparatus configured as in FIG. 5B may have a shorter AD conversion period for pixel signals from a plurality of rows of pixels 100 required for a plurality of images than that of a conventional imaging apparatus.

The imaging apparatus of this embodiment performs the operation of acquiring the digital C_off signals once during the digital C_off signal generation period. Alternatively, AD conversion for acquiring digital C_off signals may be performed a plurality of number of times during the digital C_off signal generation period from the time t1 to the time t6 illustrated in FIG. 4, and the average of the plurality of digital C_off signals may be subtracted from the digital S+C_off signal. The operation of selecting pixels 100 to perform the AD conversion for acquiring digital C_off signals a plurality of number of times may select pixels 100 at one row a plurality of number of times, or a plurality of rows of pixels 100 may be vertically scanned. A signal of the average of the thus acquired plurality of digital C_off signals may be acquired. The signal of the average of a plurality of digital C_off signals may be digital signals based on a plurality of first digital signals. The signal of the average of a plurality of digital C_off signals is a digital C_off signal to be subtracted from the digital S+C_off signal. The acquisition of the signal of the average of the plurality of digital C_off signals may sometimes reduce a component of random noise of the comparing circuit 4 contained in the digital S+C_off signal.

Alternatively, the pixel region 1 may be divided into a plurality of blocks row by row, and the digital C_off signal generation period may be provided for each block. In other words, for example, the pixel region 1 having Z rows of pixels is divided into two blocks of from the first row to the Yth row (satisfying a relational expression of Z>Y) and from the Yth row and the Zth row. The digital C_off signal generation period is provided for the first block from the first row to Yth row. The horizontal period is then provided for each of the first row to the Yth row. Then, the digital C_off signal generation period is provided for the second block from the (Y+1)th row to Zth row. Then, the horizontal period is provided for each of the (Y+1) row to the Zth row. Even in this configuration, every time pixel signals are output from pixels 100 at those rows, the period required for AD conversion on the pixel signals from a plurality of rows of pixels 100 may be shorter than that of a conventional imaging apparatus which also AD converts a noise signal.

The imaging apparatus of this embodiment may have the digital C_off signal generation period when the imaging apparatus is powered on.

The imaging apparatus of this embodiment may have one digital C_off signal generation period may be provided for every 10 frame periods, for example. The cycle for implementing the digital C_off signal generation period may be set in consideration of a temperature change and a frame rate of the imaging apparatus, for example.

The imaging apparatus of this embodiment includes a ramp-type AD converter as an example of the AD converter which compares a reference signal and a pixel signal having potentials that change depending on time. An alternative AD converter may be a successive approximation or delta sigma AD converter. An AD converter of any of the types as described above also performs the first AD conversion which generates a first digital signal on the basis of the reset potential in an input part. Then, each of a plurality of analog-digital converters performs a second AD conversion which generates a second digital signal on the basis of the potential in an input part to which pixel signals are given from a plurality of pixels. It may only be required that the number of times of first AD conversion performed by each of a plurality of analog-digital converters is fewer than the number of times of second AD conversion.

The aforementioned imaging apparatus of this embodiment has a column ADC having an AD converter at each column. However, this embodiment is not limited to the configuration. An AD converter may be commonly provided to a plurality of columns of pixels. For example, a capacitor element which holds a pixel signal is provided at each column of pixels, and an AD converter horizontally scans capacitor elements at columns and converts the output analog signals sequentially to digital signals. Also with this configuration, the first AD conversion is performed which generates a first digital signal on the basis of a reset potential in an input part. In this case, the number of times of first AD conversion performed is fewer than the number of times of second AD conversion which generates a second digital signal on the basis of the potential in an input part to which pixel signals are given. This configuration also may shorten the period of time required for AD conversion on pixel signals output by a plurality of pixels, compared with a configuration which performs the first AD conversion every time a pixel signal is output from memory.

In the imaging apparatus of this embodiment, the AD converter 12 performs a fewer number of times of AD conversion on a signal of an offset component than that in a conventional imaging apparatus. Therefore, the time of the AD conversion period may be shortened. The imaging apparatus of this embodiment may acquire a digital S signal having a less offset component of the AD converter 12.

According to this embodiment, it has been described that a difference between a plurality of digital S+C_off signals and one digital C_off signal. However, the digital C_off signals may be digital signals generated based on a first AD conversion. In other words, a digital C_off signal acquired by a same first AD conversion may be corrected properly to differentiate the signal values of the digital C_off signal to be subtracted from a plurality of digital S+C_off signals. The correction on the digital C_off signal may be based on a temperature change of the imaging apparatus, for example. The corrected digital C_off signals are digital signals resulting from correction of a first digital signal.

In FIG. 5A according to this embodiment, a digital C_off signal generation period is different from a frame period. This embodiment is not limited to this configuration. An example of a different configuration will be described. During the frame period for generating the first image, digital C_off signals and digital S+C_off signals are generated every time pixel signals are output from pixels at rows. Next, one of the plurality of generated digital C_off signals is selected or a signal acquired by averaging them is acquired. The selected or averaged signal is set as a digital C_off signal to be subtracted from the digital S+C_off signals acquired by the frame period for generating the next second image. During the frame period for the next second image, digital S+C_off signals are generated, without generating a digital C_off signal. Thus, the frame period for the second image is shorter than the frame period for the first image. Therefore, the total time of the plurality of frame periods may be shorter than the total time by a conventional imaging apparatus.

In the timing chart illustrated in FIG. 4 according to this embodiment, a digital C_off signal is output from the N memory every horizontal period. However, this embodiment is not limited to the configuration. For example, during a digital C_off signal generation period, a digital C_off signal may be output from the N memory to the signal processing circuit 10. The signal processing circuit 10 holds the digital C_off signal. The signal processing circuit 10 may output a difference between the held digital C_off signal and a digital S+C_off signals output every horizontal period.

Second Exemplary Embodiment

An imaging apparatus according to a second embodiment will be described with a focus on differences from the imaging apparatus according to the first embodiment.

Figure 6A:
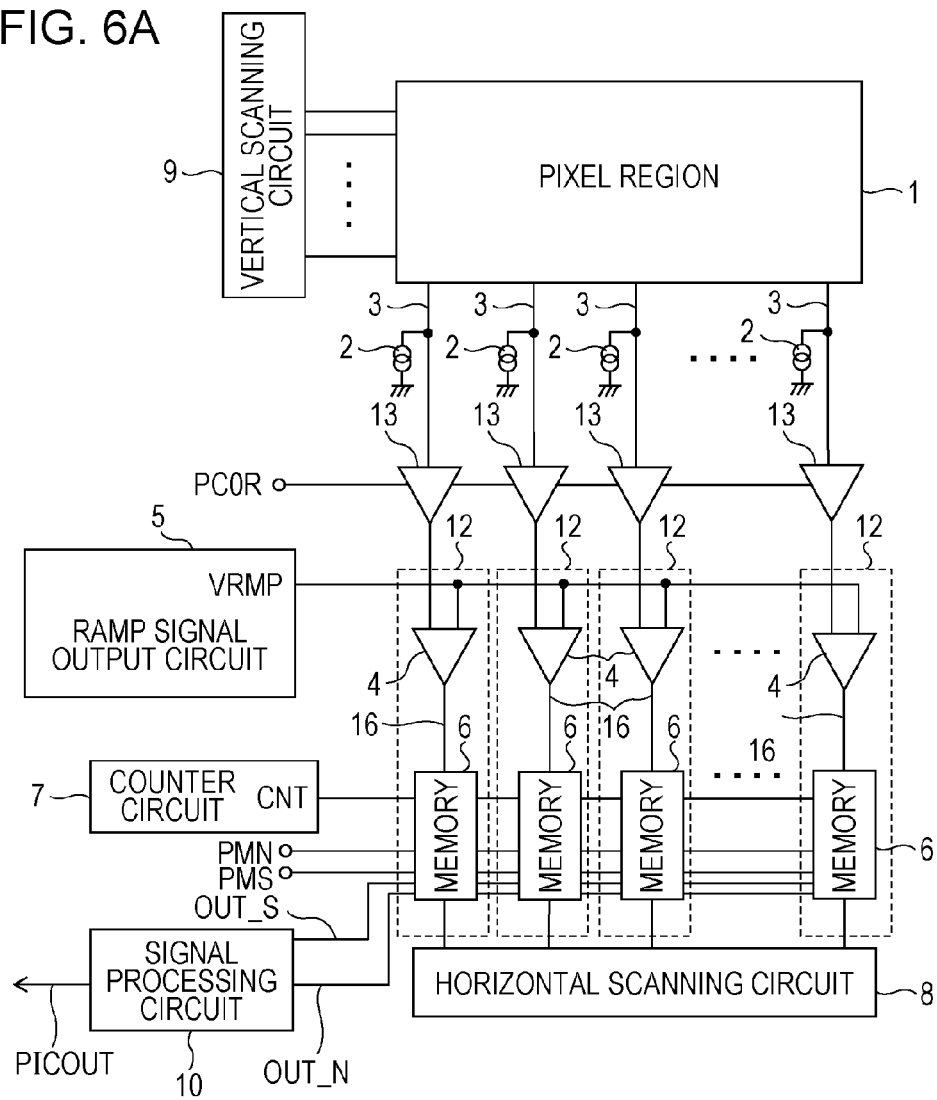
FIG. 6A is a schematic diagram of an example of an imaging apparatus.

FIG. 6A is a block diagram illustrating an example of an imaging apparatus according to the second embodiment. The imaging apparatus according to this embodiment includes an amplifying unit 13 which inverting amplifies a pixel signal PIXOUT and outputs the result to the comparing circuit 4. The amplifying unit 13 receives an amplifying-unit reset signal PC0R from a timing generator, not illustrated.

Figure 6B:
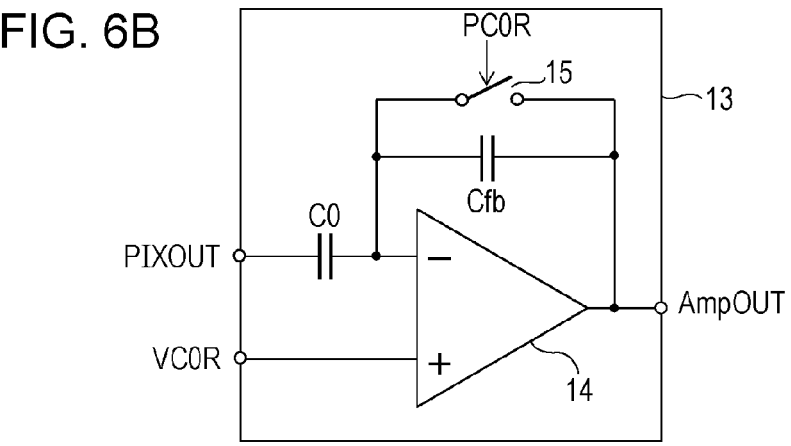
FIG. 6B is a schematic diagram of an example of an amplifying unit.

FIG. 6B is a block diagram illustrating an example of a configuration of the amplifying unit 13. The pixel signal PIXOUT is given to an inverting input terminal of an inverting amplifier 14 through input capacitor element C0. A reference voltage VC0R is applied to a non-inverting input terminal of the inverting amplifier 14. A feedback capacitor element Cfb is provided on a feedback path which electrically connects between an output terminal and an input terminal of the inverting amplifier 14. An amplifying-unit reset switch 15 is further provided which resets charges in the input capacitor element C0 and feedback capacitor element Cfb. The inverting amplifier 14 outputs to the comparing circuit 4 a signal Ampout acquired by inverting amplifying a pixel signal PIXOUT on the basis of the capacitance ratio between the feedback capacitor element Cfb and the input capacitor element C0. According to this embodiment, the input capacitor element C0 holds a noise signal output by a pixel 100. The comparing-circuit input capacitor element 34 is a second capacitor element which holds an offset component of the amplifying unit 13 according to this embodiment.

Figure 7:
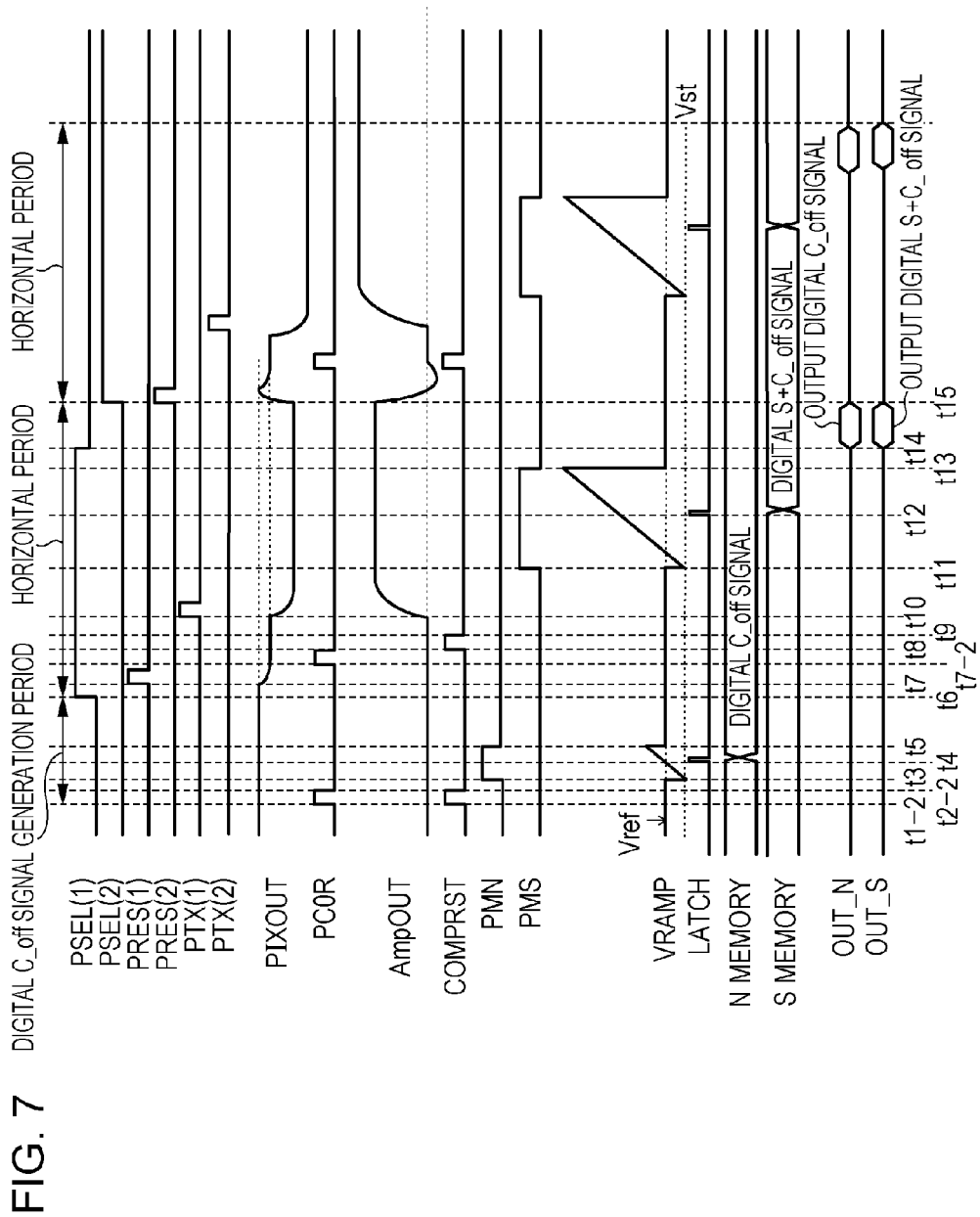
FIG. 7 is a timing chart illustrating an example of an operation of an imaging apparatus.

FIG. 7 illustrates an example of an operation of the imaging apparatus exemplarily illustrated in FIG. 6A. The comparing circuit 4 in the imaging apparatus in FIG. 6A compares between a signal Ampout acquired by inverting amplifies a pixel signal PIXOUT and a reference signal VRAMP. The operation of the imaging apparatus illustrated in FIG. 4 monotonically reduces the potential of a reference signal VRAMP dependently on time while the operations of the imaging apparatus in FIG. 7 monotonically increases the potential of a reference signal VRAMP dependently on time.

At a time t1-2, the amplifying-unit reset signal PC0R is shifted to an H level. The other of the operation at a time t1 may be the same as the operation at the time t1 illustrated in FIG. 4.

At a time t2-2, the amplifying-unit reset signal PC0R is shifted to an L level. The other of the operation at a time t2 may be the same as the operation at the time t2 illustrated in FIG. 4.

The operation from a time t3 to a time t7 may be the same as the operation from the time t3 to the time t7 illustrated in FIG. 4. In other words, after an amplifying-unit reset switch 15 that is a first switch and a comparing-circuit reset switch 31 or 31-2 that is a second switch is shifted from a conducting state to a non-conducting state, the AD converter 12 performs a first AD conversion.

At a time t7-2, the amplifying-unit reset signal PC0R is shifted to an H level. This brings the amplifying-unit reset switch signal Ampout 15 into a conducting state, which resets charges in the input capacitor element C0 and feedback capacitor element Cfb. After that, the amplifying-unit reset signal PC0R is shifted to an L level, and cancels the reset of charges in the input capacitor element C0 and feedback capacitor element Cfb.

The operations from a time t8 to a time t15 may be the same as the operation from the time t8 to the time t15 illustrated in FIG. 4.

Also according to the imaging apparatus of this embodiment, pixel signals PIXOUT of pixels 100 at a plurality of rows are converted to digital signals by providing one digital C_off signal generation period followed by a plurality of horizontal periods as illustrated in FIGS. 5A and 5B, like the first embodiment.

Also according to the imaging apparatus of this embodiment, one digital C_off signal generation period is provided for a period for vertically scanning a plurality of rows of pixels 100, like the first embodiment. Alternatively, one digital C_off signal generation period may be provided a plurality of periods for vertically scanning a plurality of rows of pixels 100. Thus, the same effect as that of the first embodiment may be acquired.

According to this embodiment, the amplifying unit 13 inverting amplifies and outputs a pixel signal PIXOUT to the comparing circuit 4. Alternatively, the amplifying unit 13 may non-inverting amplify and output a pixel signal PIXOUT to the comparing circuit 4.

According to this embodiment, the time (t7-2) for shifting an amplifying-unit reset signal PC0R to an H level and the time (t8) for shifting the comparing circuit reset signal COMPRST to an H level timing are differentiated. Alternatively, the amplifying-unit reset signal PC0R and the comparing circuit reset signal COMPRST may be shifted to an H level time simultaneously at the time t7-2 or t8 and then may be shifted from the H level to an L level simultaneously.

Third Exemplary Embodiment

An imaging apparatus according to a third embodiment will be described with a focus on differences from the second embodiment.

Figure 8:
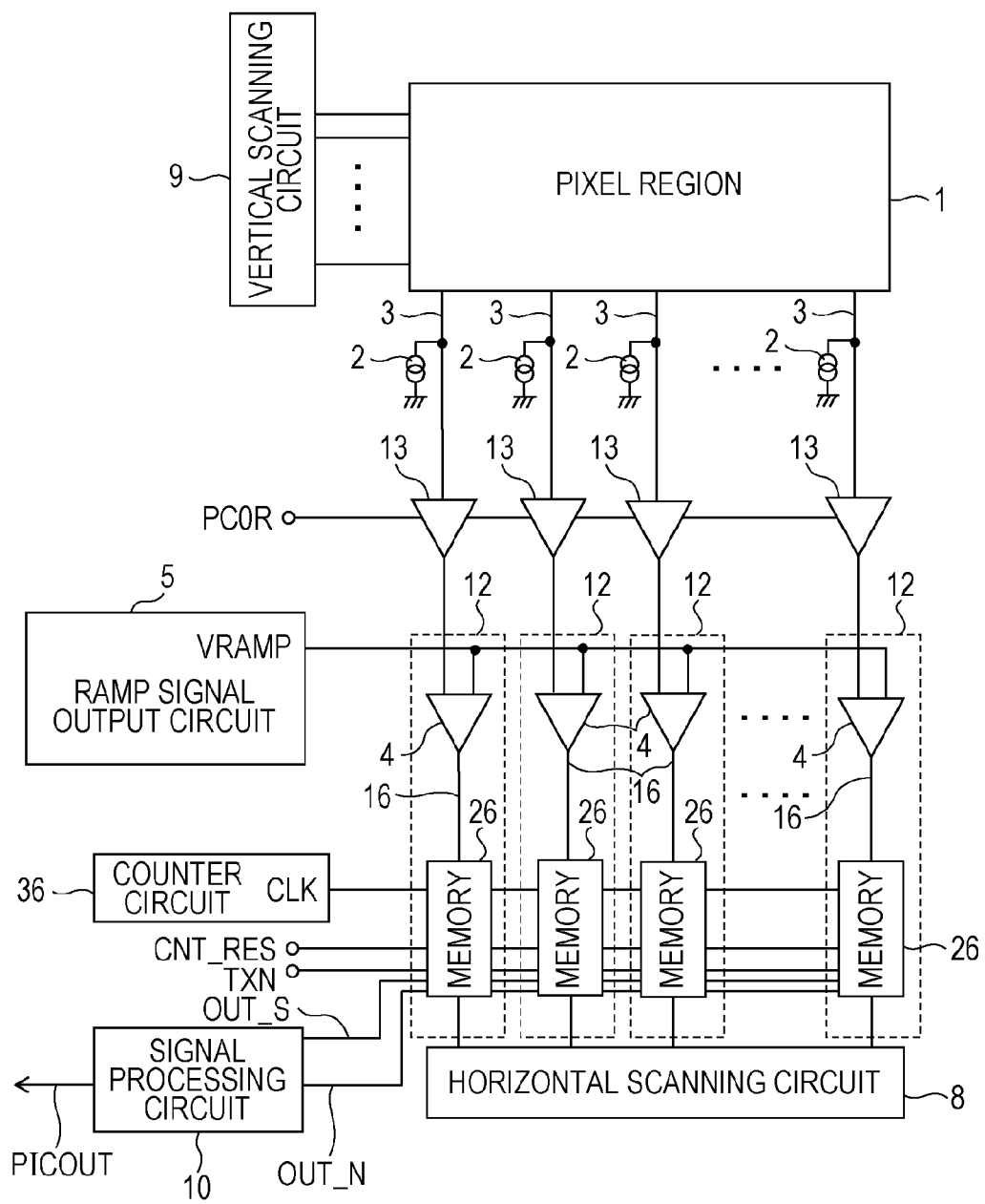
FIG. 8 is a schematic diagram illustrating an example of an imaging apparatus.

In the imaging apparatus according to the second embodiment, the counter circuit 7 outputs a count signal CNT to the memory 6 at each column. FIG. 8 is a block diagram illustrating an example of an imaging apparatus according to this embodiment. The imaging apparatus of this embodiment has a column counter circuit 26 correspondingly to the comparing circuit 4. A clock signal CLK is given from a clock signal supply unit 36 to the column counter circuits 26. A signal TXN and a count reset signal CNT_RES are given from a timing generator, not illustrated, to the column counter circuit 26.

Figure 9:
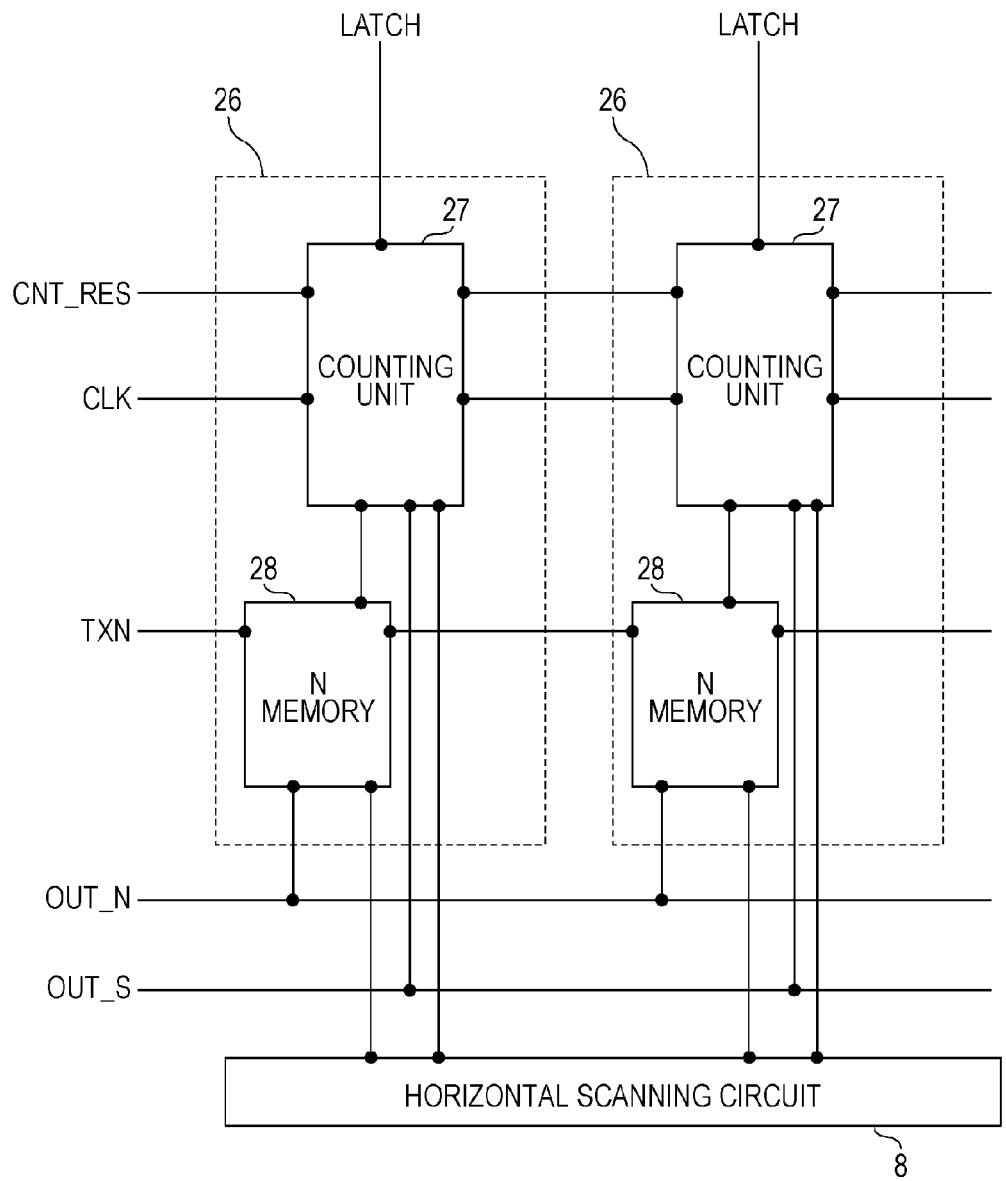
FIG. 9 is a schematic diagram illustrating an example of a memory.

FIG. 9 is a block diagram illustrating details of the column counter circuit 26 according to this embodiment. The column counter circuit 26 illustrated in FIG. 9 illustrates two column counter circuits 26 extracted from the imaging apparatus illustrated in FIG. 8. Each of the column counter circuits 26 has a counting unit 27 and an N memory 28. A count reset signal CNT_RES is given from a timing generator, not illustrated, to the counting unit 27. A clock signal CLK is given from the clock signal supply unit 36 to the counting unit 27. A latch signal LATCH is given from the comparing circuit 4 to the counting unit 27. A signal TXN is given from a timing generator, not illustrated, to the N memory 28. If a signal TXN has an H level, the N memory 28 holds a count signal CTN held by the counting unit 27. The horizontal scanning circuit 8 sequentially scans the column counter circuits 26. The selected column counter circuit 26 outputs the count signal CNT held by the counting unit 27 and N memory 28 to the signal processing circuit 10.

Figure 10:
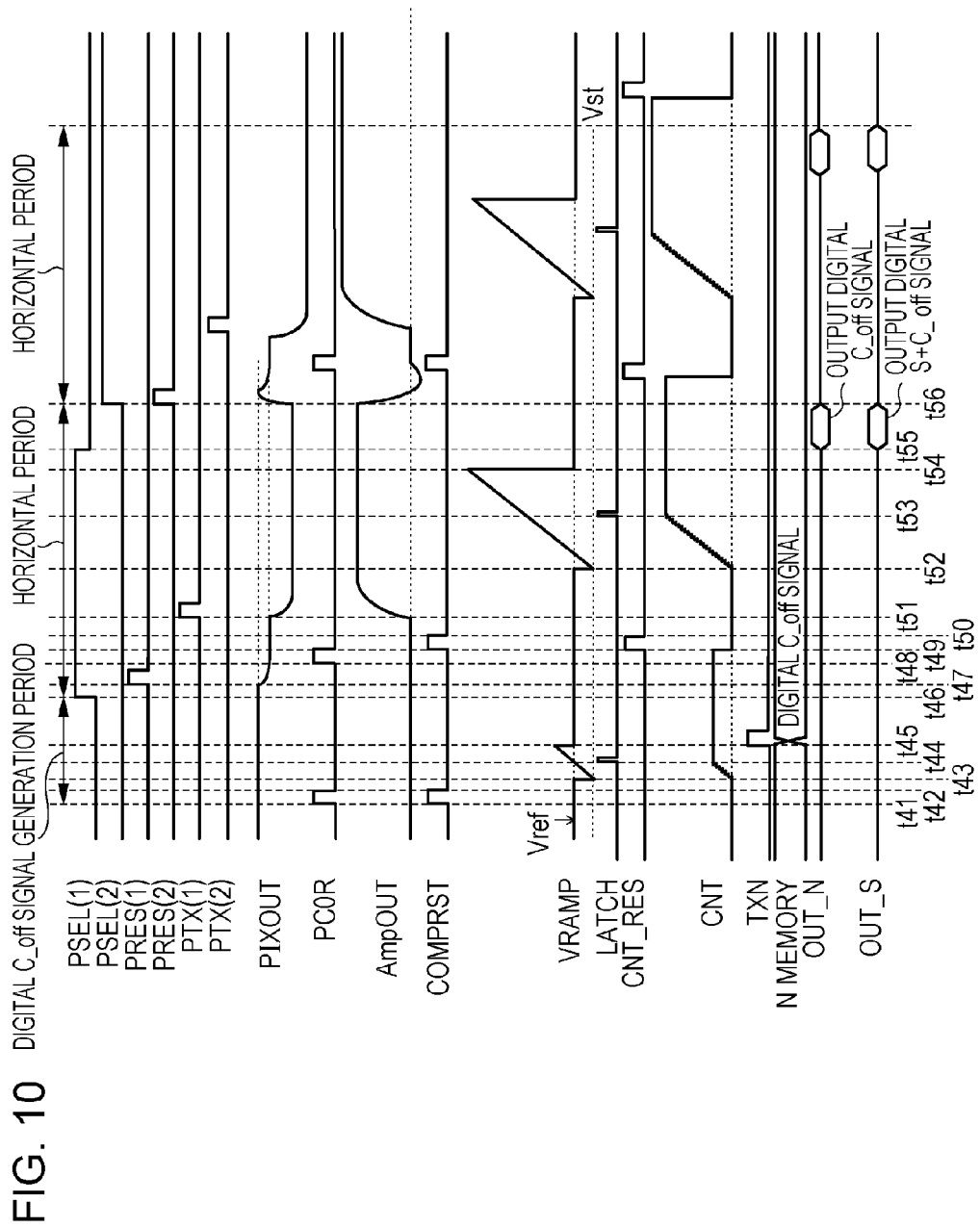
FIG. 10 is a timing chart illustrating an example of an operation of an imaging apparatus.

FIG. 10 illustrates examples of operations of the imaging apparatus according to this embodiment. The "CNT" in FIG. 10 refers to a count signal CNT generated by the counting unit 27.

At a time t41, the signal TXN and count reset signal CNT_RES have an L level. The other operations may be the same as those at the time t1-2 according to the second embodiment.

The operations at a time t42 may be the same as the operations at the time t2-2 according to the second embodiment.

At a time t43, the ramp signal output circuit 5 starts the change of the potential depending on time of the reference signal VRAMP. The counting unit 27 starts counting clock signals CLK in response to the start of comparison between the reference signal VRAMP and the signal Ampout by the comparing circuit 4. The other operations may be the same as the operations at the time t3 according to the second embodiment.

At a time t44, the latch signal LATCH is shifted to an H level. Thus, the counting unit 27 finishes the counting of clock signals CLK and holds the count signal CNT at that time. The count signal CNT is a digital C_off signal.

At a time t45, the ramp signal output circuit 5 finishes the change of the potential depending on time of the reference signal VRAMP. The signal TXN is shifted to an H level. Thus, the digital C_off signal held by the counting unit 27 is held by the N memory 28.

The operations from a time t46 to a time t48 may be the same as the operations at the time t6, time t7, and time t7-2 according to the second embodiment.

At a time t49, the count reset signal CNT_RES is shifted to an H level. Thus, the count signal CNT in the counting unit 27 is reset. The other operations may be the same as the operations at the time t8 according to the second embodiment.

The operations at times t50 and t51 may be the same as the operations at the times t9 and t10 according to the second embodiment.

At a time t52, the ramp signal output circuit 5 starts the change of the potential depending on time of the reference signal VRAMP. The counting unit 27 starts counting clock signals CLK in response to the start of comparison between the reference signal VRAMP and the signal Ampout by the comparing circuit 4.

At a time t53, the latch signal LATCH is shifted to an H level. Thus, the counting unit 27 finishes the counting of clock signals CLK and holds the count signal CNT at that time. The count signal CNT is a digital S+C_off signal.

At a time t54, the ramp signal output circuit 5 finishes the change of the potential depending on time of the reference signal VRAMP.

During a period from a time t55 to a time t56, the horizontal scanning circuit sequentially selects the column counter circuits 26, and the column counter circuits 26 are caused to output a digital C_off signal and a digital S+C_off signal to the signal processing circuit 10.

Thus, the imaging apparatus of this embodiment may also provide a digital C_off signal and a digital S+C_off signal.

The imaging apparatus of this embodiment may also provide the same effect as that of the first embodiment or second embodiment.

Fourth Exemplary Embodiment

Figure 11:
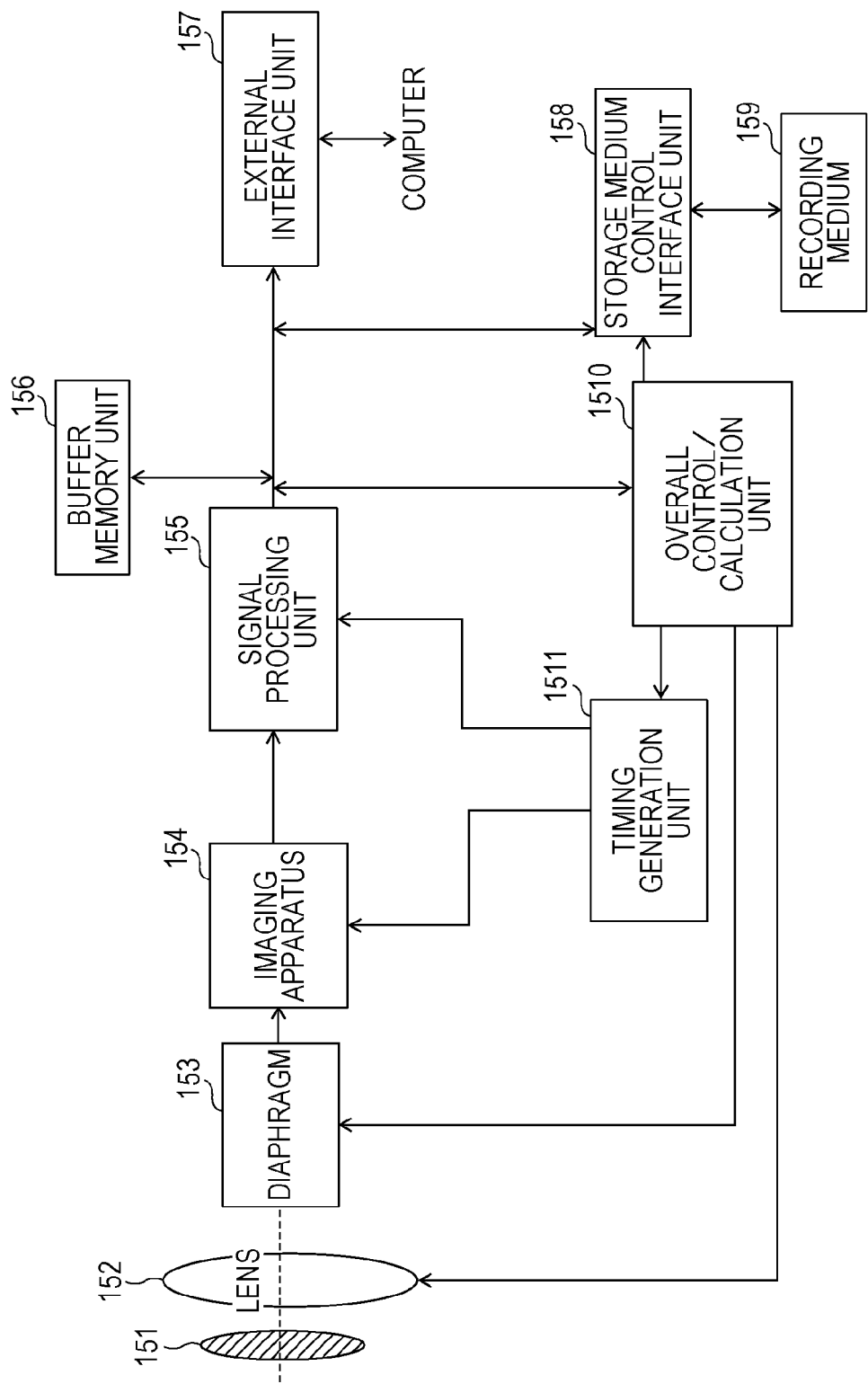
FIG. 11 is a schematic diagram illustrating an example of an imaging system.

An embodiment will be described in which an imaging apparatus according to the first to third embodiments are applied to an imaging system. The imaging system may be a digital still camera, a digital camcorder, a monitor camera or the like. FIG. 11 illustrates a block diagram of a digital still camera that is an example of an imaging system to which the imaging apparatus is applied. Referring to FIG. 11, the imaging system includes a lens 152 which focuses an optical image of an object in the imaging apparatus 154, a barrier 151 for protecting the lens 152, and a diaphragm 153 for making the quantity of light through the lens 152 variable. The imaging system further includes a signal processing unit 155 which processes an output signal output by the imaging apparatus 154.

The signal processing unit 155 has a digital signal processing unit and performs operations of performing a correction as required, compressing and outputting a signal output from the imaging apparatus 154. According to the first to third embodiments, signal processing circuit 10 as a difference signal generation unit performs processing of acquiring a difference between a digital C_off signal and a digital S+C_off signal. In this configuration, a digital S signal is given to the signal processing unit 155. Alternatively, a digital C_off signal and a digital S+C_off signal are output from the imaging apparatus 154 to the signal processing unit 155. In this configuration, the signal processing unit 155 as a difference signal generation unit may perform processing of acquiring a difference between a digital C_off signal and a digital S+C_off signal. The AD converter 12 may be provided externally to the imaging apparatus 154. For example, the signal processing unit 155 may have the AD converter 12 which converts an analog signal output from the imaging apparatus 154 to a digital signal.

The imaging system includes a buffer memory unit 156 which temporarily stores image data and a storage medium control interface unit 158 to be used for recording or reading to or from a recording medium. The imaging system further includes a detachable recording medium 159 such as a semiconductor memory which may be used for recording or reading to or from image data. The imaging system further includes an external interface unit 157 which may be used for communication with an external computer or the like, a overall control/calculation unit 1510 which controls arithmetic operations and the entire digital still camera, and an imaging apparatus 154. According to the first to third embodiments, a timing generator, not illustrated, in the imaging apparatus 154 controls operations of the AD converters 12 at columns. Alternatively, the general control/computing unit 1510 in the imaging system may cause the AD converter 12 to perform the first AD conversion and the second AD conversion. The general control/computing unit 1510 may be a control unit which causes the AD converter 12 to perform the first AD conversion a fewer number of times than the second AD conversion. The imaging system includes a timing generation unit 1511 which outputs a timing signal to the signal processing unit 155. In this case, a timing signal may be externally given. The imaging system may include at least the imaging apparatus 154 and the signal processing unit 155 which processes an output signal from the imaging apparatus 154.

In this way, the imaging system of this embodiment may apply the imaging apparatus 154 to perform an imaging operation.

The imaging apparatus according to the aforementioned embodiments may reduce the time of an AD conversion period for pixel signals from a plurality of pixels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-193139, filed Sep. 3, 2012, which is hereby incorporated by reference herein in its entirety.

What is claimed is:

1. A method for driving an imaging apparatus having a plurality of pixels including a first pixel and a second pixel each of which outputs a photoelectric conversion signal based on incident light and an analog-digital converter having an input part which receives input of a potential based on the photoelectric conversion signals, the method comprising:
generating, by the analog-digital converter, a first digital signal by performing an AD conversion based on a reset potential at the input part;
generating, by the analog-digital converter, a second digital signal by performing an AD conversion based on the potential at the input part to which the potential based on the photoelectric conversion signal of the first pixel is given;
generating, by the analog-digital converter, a third digital signal by performing an AD conversion based on the potential at the input part to which the potential based on the photoelectric conversion signal of the second pixel is given;
acquiring a first difference between the first digital signal and the second digital signal; and
acquiring a second difference between the first digital signal used for acquiring the first difference, and the third digital signal.

2. The method according to claim 1, wherein
the plurality of pixels are caused to output the photoelectric conversion signals for forming a first image;
the analog-digital converter converts each of the photoelectric conversion signals for forming the first image to digital signals;
the plurality of pixels are caused to output the photoelectric conversion signals for forming a second image;
the analog-digital converter converts the photoelectric conversion signals for forming the second image to digital signals; and third differences are acquired between the first digital signal and each of the digital signals for forming the first image, and fourth differences are acquired between the first digital signal used for acquiring the third differences and each of the digital signals for forming the second image.

3. The method according to claim 1, wherein differences are acquired between the second digital signal of a first frame period and the first digital signal, between the third digital signal of the first frame period and the first digital signal, between the second digital signal of a second frame period and the first digital signal, and between the third digital signal of the second frame period and the first digital signal.

4. The method according to claim 3, wherein the plurality of pixels are arranged in a plurality of rows; the imaging apparatus further has a vertical scanning circuit which scans the plurality of pixels row by row; and each of the first and second frame periods is a period from a start of sequential scanning of a plurality of pixels by the vertical scanning circuit through ends of the sequentially scanning of the plurality of pixels row by row to a start of the next sequential scan of a plurality of pixels by the vertical scanning circuit.

5. The method according to claim 1, wherein the imaging apparatus further has a vertical scanning circuit; each of the first pixel and the second pixel is arranged in a different row; the analog-digital converter generates the first digital signal and then the vertical scanning circuit sequentially scans a row in which the first pixel is arranged, and a row in which the second pixel is arranged; and the analog-digital converter generates the second digital signal and the third digital signal sequentially without generating the first digital signal between generation of the second digital signal and generation of the third digital signal.

6. The method according to claim 1, wherein the analog-digital converter has a comparing circuit having a reference-signal input terminal; the reference-signal input terminal receives input of a reference signal having a potential that changes depending on time; the comparing circuit outputs a comparison result signal representative of a result of a comparison between the potentials given to the input part and the reference-signal input terminal; and the analog-digital converter generates the first, second and third digital signals on the basis of the comparison result signal.

7. The method according to claim 1, wherein the imaging apparatus has a capacitor element in an electrical path between the plurality of pixels and the input part; and each of the plurality of pixels further outputs a noise signal, and the capacitor elements hold the noise signal.

8. The method according to claim 7, wherein the imaging apparatus further comprises an amplifying unit; and a second capacitor element, wherein the amplifying unit is connected to the input part via the second capacitor, and the capacitor element is connected to the input part via the amplification unit and the second capacitor element, and the amplifying unit outputs a signal acquired by amplifying the photoelectric conversion signal to the input part through the second capacitor element.

9. The method according to claim 8, wherein charges in the capacitor element and the second capacitor element are reset, and the first digital signal is generated thereon after cancelling the reset on the capacitor element and the second capacitor element.

10. The method according to claim 1, wherein the AD conversion which generates the first digital signal is performed a plurality of number of times to generate a plurality of the first digital signals, and differences are acquired between an average of the plurality of first digital signals and the second digital signal, and between the average and the third digital signal.

11. The method according to claim 8, further comprising: resetting charges in the capacitor element and the second capacitor element; cancelling the reset on the capacitor element and the second capacitor element; and then generating the first digital signal during a period until the noise signal is output from the pixels to the capacitor element.

12. The method according to claim 9, wherein a plurality of the first digital signals are generated by resetting charges in the capacitor element and the second capacitor element, cancelling the reset on the capacitor element and the second capacitor element and then performing the AD conversion which generates the first digital signal a plurality of number of times; and differences are acquired between an average of the plurality of first digital signals and the second digital signal, and between the average and the third digital signal.

13. The method according to claim 1, wherein each of the difference between the first digital signal and the second digital signal, and the difference between the first digital signal and the third digital signal is acquired by using a digital signal acquired by correcting the first digital signal instead of the first digital signal.

14. The method according to claim 1, wherein the first digital signal is generated upon powering on the imaging apparatus.

15. A method for driving an imaging system having an imaging apparatus, a signal processing unit, and an analog-digital converter, the imaging apparatus having a plurality of pixels including a first pixel and a second pixel, each of which outputs a photoelectric conversion signal based on incident light, the analog-digital converter having an input part which receives input of a potential based on the photoelectric conversion signals output by the plurality of pixels, the driving method comprising:
generating, by the analog-digital converter, a first digital signal by performing an AD conversion based on the reset potential at the input part;
generating, by the analog-digital converter, a second digital signal by performing an AD conversion based on the potential at the input part to which the potential based on the photoelectric conversion signal of the first pixel is given;
generating, by the analog-digital converter, a third digital signal by performing an AD conversion based on the potential at the input part to which the potential based on the photoelectric conversion signal of the second pixel is given;
outputting the first, second and third digital signals to the signal processing unit, by the imaging apparatus;

acquiring a first difference between the first digital signal and the second digital signal; and acquiring a second difference between the first digital signal used for acquiring the first difference and the third digital signal.

16. An imaging apparatus comprising:

a plurality of pixels including a first pixel and a second pixel each of which outputs a photoelectric conversion signal based on incident light;

an analog-digital converter having an input part which receives input of a potential based on the photoelectric conversion signals output by the plurality of pixels;

a control unit; and a difference signal generation unit, wherein the control unit causes the analog-digital converter to perform an AD conversion which generates a first digital signal based on the reset potential at the input part;

causes the analog-digital converter to perform an AD conversion which generate generates a second digital signal based on the potential at the input part to which the potential based on the photoelectric conversion signal of the first pixel is given; and causes the analog-digital converter to perform an AD conversion which generates a third digital signal based on the potential at the input part to which the potential based on the photoelectric conversion signal of the second pixel is given; and the difference signal generation unit acquires a first difference between the first digital signal and the second digital signal, and a second difference between the first digital signal used for acquiring the first difference and the third digital signal.

* * * * *